United States Patent Office 2,721,409
Patented Oct. 25, 1955

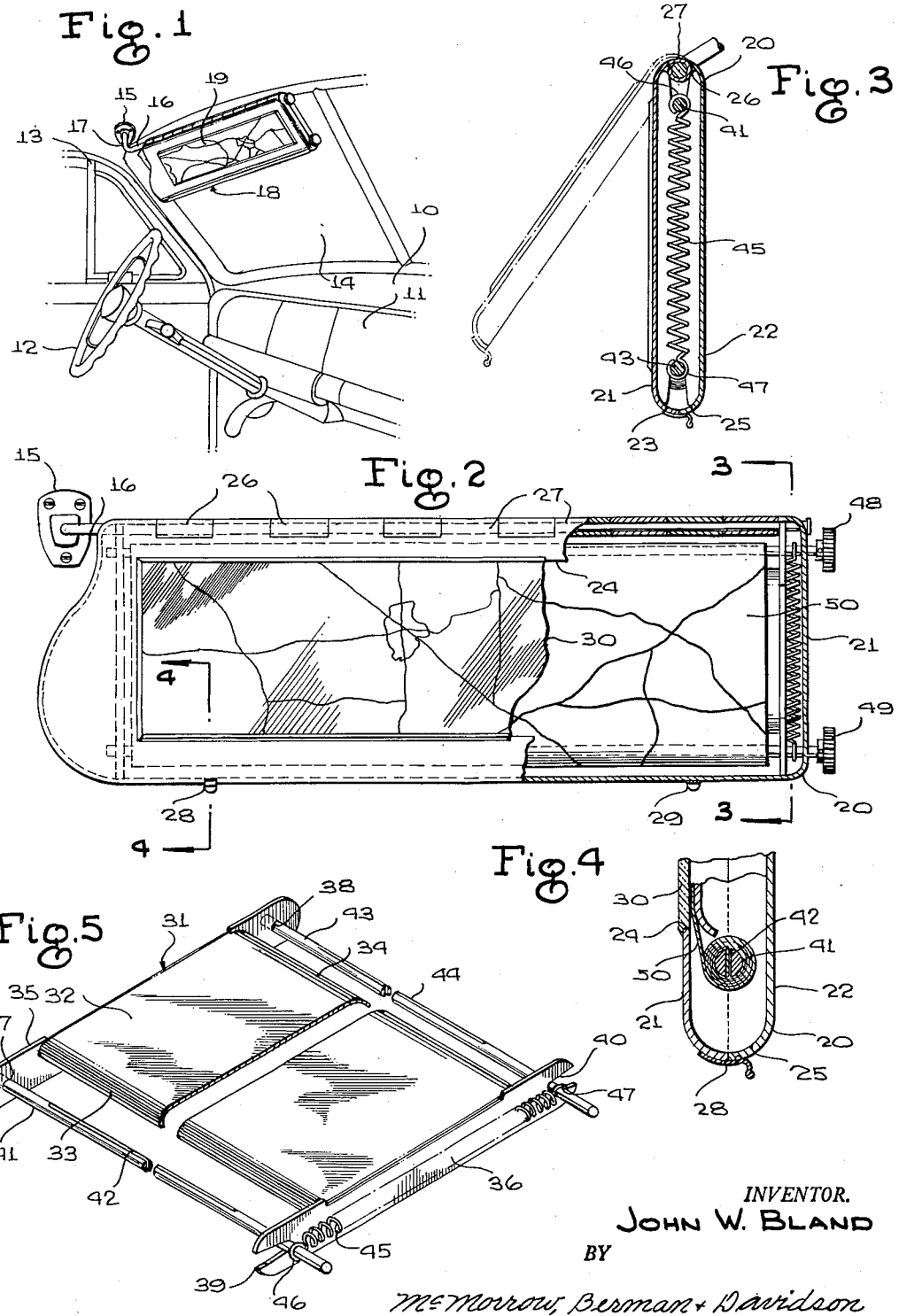

2,721,409

COMBINED INTERIOR AUTOMOBILE VISOR AND MAP HOLDER

John W. Bland, Indianapolis, Ind.

Application November 14, 1952, Serial No. 320,578

3 Claims. (Cl. 40—86)

This invention relates to map holders for automobiles and more particularly to a map holder which also functions as an interior sun visor.

It is among the objects of the invention to provide an improved road map holder for automobiles which is shaped, dimensioned and mounted to function as an interior sun visor for the driver's compartment of the automobile; which has a capacity sufficient to hold a plurality of maps covering a selected area of a country and includes manually operated map winding means so arranged that any portion of any map mounted in the holder can be exposed to view; which completely encloses and protects the map and has a transparent window through which selected portions of the associated maps can be observed; which can be mounted in an automobile in replacement of or substitution for the usual interior sun visor in the driver's compartment of the automobile; and which is simple and durable in construction, economical to manufacture, easy to use, and neat and attractive in appearance.

Other objects and advantages will become apparent from a consideration of the following description and the appended claims in conjunction with the accompanying drawing, wherein:

Figure 1 is a fragmentary perspective view of the interior of an automobile showing the location of the map holder in the automobile;

Figure 2 is a front elevational view of the map holder on an enlarged scale, a portion being broken away and shown in cross section to better illustrate the construction thereof;

Figure 3 is a transverse cross sectional view on the line 3—3 of Figure 2;

Figure 4 is a fragmentary transverse cross sectional view on the line 4—4 of Figure 2; and Figure 5 is a fragmentary perspective view of a map strip carrier constituting a component of the map holder.

With continued reference to the drawing, there is illustrated in Figure 1 a portion of a driver's compartment of a conventional automobile, the illustration fragmentarily showing an inner cowl 10, instrument panel 11, steering wheel 12, front door 13 and wind shield 14 in their proper relationship to each other.

A socket fitting 15 for an interior sun visor for the driver's compartment is mounted in the automobile body between the front upper corner of the front door 13 and the adjacent upper corner of the wind shield 14. A visor supporting rod 16 has at one end a universal joint connection with the socket fitting 15 and suitable means, well known to the art, are connected between the rod 16 and the socket fitting 15 to frictionally hold the rod in selected positions of angular adjustment relative to the socket fitting 15.

The rod 16 is preferably tubular and has near its end connected to the fitting 15 an angular bend 17. This rod 16 normally supports an interior sun visor of known or conventional construction adjacent the wind shield 14. In accordance with the present invention, however, a map holder, generally indicated at 18, is mounted on the rod 16 in substitution for or replacement of the usual interior sun visor and this map holder has substantially the same size and substantially the same substantially rectangular shape as the interior sun visor which it replaces and has in its side remote from the wind shield 14 and adjacent the driver of the automobile a transparent window 19 through which a road map disposed in the holder can be viewed.

The map holder comprises a hollow housing 20 constituted by a pair of dish-shaped sides 21 and 22 formed of suitable sheet material, such as sheet metal, and each having at least one straight side edge.

The housing side 21 has a marginal flange 23 arcuately curved transversely and extending entirely therearound and is provided with a window opening 24 of elongated rectangular shape. The housing side 22 has a marginal flange 25 which is arcuately curved transversely and extends entirely around the corresponding housing side and this housing side 22 is provided along the straight side edge thereof with spaced apart hinge sleeves 26 of cylindrical shape. The housing side 21 is provided along its straight side edge with spaced apart hinge sleeves 27 of cylindrical shape disposed one between each two adjacent sleeves 26 on the housing side 22 and the rod extends longitudinally through the aligned sleeves 26 and 27 providing a piano type hinge between the housing sides 21 and 22 along the corresponding straight side edges of the housing sides.

The housing sides are movable toward and away from each other about the hinge connection therebetween and when folded together the edge of the marginal flange on one side engages and registers with the edge of the marginal flange on the other side and spring clips 28 and 29 are secured on the housing side 21 at spaced apart locations along the side edge thereof remote from the hinge and project beyond the edge of the flange 23 to engage detents on the flange 25 of the side 22 to releasably hold the sides together. The spring clips are manually releasable from the side 22 so that the side 21 can be swung away from the side 22 to open the housing for the replacement of a map strip carrier and map strip in the housing. A transparent pane 30 of suitable sheet material, such as a synthetic resin plastic, is marginally secured to the housing side 21 in closing relationship to the window opening 24.

A map strip carrier, generally indicated at 31, is loosely received in the housing 20 and comprises a structure formed of suitable sheet material, such as sheet metal. This carrier includes an intermediate portion 32 of rectangular shape having a length and width slightly greater than the length and width of the window opening 24 and having its side edges transversely rounded, as indicated at 33 and 34. End flanges 35 and 36 extend transversely of the intermediate portion 34 one at each end of the latter and project perpendicularly from the side of the intermediate portion at which the side edges 33 and 34 thereof are concavely curved. The flanges 35 and 36 have a width substantially equal to the interior thickness of the housing 20 and a length substantially equal to the interior width of the housing and greater than the width of the intermediate portion 32 and have their ends rounded to fit the curved inner surfaces of the flanges 23 and 25 of the housing sides 21 and 22.

The flange 35 is provided with apertures 37 and 38 disposed one between each end of this flange and the adjacent side edge of the intermediate portion 32 and the flange 36 is provided with notches 39 and 40 extending inwardly one from each end of the flange and terminating between the corresponding ends of the flange and the adjacent side edges of the intermediate portion 32.

A shaft 41 is journalled near one end in the aperture 37 and extends intermediate its length through the notch 39, this shaft being provided between the flanges 35 and 36 with a longitudinally extending slot 42. A shaft 43, similar to the shaft 41, is journaled near one end in the aperture 38 and is received intermediate its length in the notch 40, being provided between the flanges 35 and 36 with a longitudinally extending slot 44. The shafts 41 and 44 are held by the flanges 35 and 36 in spaced apart and substantially parallel relationship to each other and outwardly of the adjacent side edges of the intermediate portion 32 of the structure 31 and a tension spring 45 extends between the shafts at the outer side of the flange 36 and is provided at its opposite ends with hooks 46 and 47 which extend respectively around the shafts 41 and 43 to releasably hold the shafts in the corresponding notches 39 and 40.

When the carrier 31 is disposed in the housing 20 the shafts 41 and 43 extend from the flange 36 through apertures provided by notches in the end portions of the housing side flanges 23 and 25 at the end of the housing remote from the socket fitting 15 and hand knobs 48 and 49 are secured on the ends of the shafts 41 and 43 respectively, disposed outside of the housing 20 for manually rotating the shafts.

A map strip 50 comprising an elongated strip of flexible sheet material, such as paper, having cartographical information on at least one side thereof, is wound at its opposite ends on the shafts 41 and 43 and extends over the intermediate portion 32 of the structure 31 with its portion between the shafts disposed between the intermediate portion 32 and the transparent pane 30, the carrier being placed in the housing 20 so that the carrier intermediate portion 32 is adjacent the transparent pane 30.

Winding of the map strip on the shafts 41 and 43 may be facilitated by placing end tabs on the map strip in the slots 42 and 44 in the shafts and a map strip and carrier assembly in the housing may be replaced by a different assembly by merely opening the housing, removing the map strip and carrier assembly therefrom, placing a different map strip and carrier assembly in the housing and closing the housing.

The spring 45 and hooks 46 and 47 provide a braking action on the shafts 41 and 43 so that these shafts will remain in the rotational positions to which they are brought by the hand knobs 48 and 49.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A combination interior automobile visor and map holder comprising: a mounting rod adapted at one end for connection to an automobile interior visor mount; a housing hingedly connected along one edge to said rod and including hingedly connected side portions one of which has a window opening; a map carrier within the housing including a frame formed with an intermediate portion and end flanges rigid with the intermediate portion and extending along opposite sides of the frame, at least one of the end flanges having longitudinal notches opening upon opposite ends thereof and the other end flange having apertures aligned longitudinally of the frame with the respective notches; shafts journaled in the respective aligned apertures and notches; a tension spring connected at its ends to the respective shafts adjacent the notched flange and tensioned to draw the shafts toward one another to bind the shafts frictionally against the inner ends of the notches in selected positions of rotatable adjustment of the shafts; a strip having cartographic information delineated thereon having its ends coiled about the shafts and extending over the intermediate portion in position to be seen through the opening; and means outside the housing on one at least of the shafts for rotating the same.

2. A combination interior automobile visor and map holder comprising: a mounting rod adapted at one end for connection to an automobile interior visor mount; a housing hingedly connected along one edge to said rod and including hingedly connected side portions one of which has a window opening; a map carried within the housing including a frame bodily removable from the housing and formed of a single piece of sheet material shaped to include a generally flat intermediate portion formed with transversely rounded side edges and end flanges integral with the intermediate portion and extending in parallel relation in planes normal to the plane of the intermediate portion, the ends of the end flanges projecting beyond the side edges of the intermediate portion, at least one of the end flanges having longitudinal notches opening upon opposite ends thereof and the other end flange having apertures aligned longitudinally of the frame with the respective notches; shafts journaled in the respective aligned apertures and notches; a tension spring connected at its ends to the respective shafts adjacent the notched flange and tensioned to draw the shafts toward one another to bind the shafts frictionally against the inner ends of the notches in selected positions of rotatable adjustment of the shafts; a strip having cartographic information delineated thereon having its ends coiled about the shafts and extending over the intermediate portion in position to be seen through the opening; and means outside the housing on one at least of the shafts for rotating the same.

3. A combination interior automobile visor and map holder comprising: a mounting rod adapted at one end for connection to an automobile interior visor mount; a housing hingedly connected along one edge to said rod, the housing including side portions one of which has a window opening, the side portions having aligned hinge sleeves along said edge of the housing, the rod extending through the hinge sleeves to connect the housing to the rod for bodily swinging movement about the axis of the rod and to connect the side portions for swinging movement about said axis relative to one another; a map carried within the housing including a frame formed with an intermediate portion and end flanges rigid with the intermediate portion and extending along opposite sides of the frame, at least one of the end flanges having longitudinal notches opening upon opposite ends thereof and the other end flange having apertures aligned longitudinally of the frame with the respective notches; shafts journaled in the respective aligned apertures and notches; a tension spring connected at its ends to the respective shafts adjacent the notched flange and tensioned to draw the shafts toward one another to bind the shafts frictionally against the inner ends of the notches in selected positions of rotatable adjustment of the shafts; a strip having cartographic information delineated thereon having its ends coiled about the shafts and extending over the intermediate portion in position to be seen through the openings; and means outside the housing on one at least of the shafts for rotating the same.

References Cited in the file of this patent

UNITED STATES PATENTS

| | | |
|---|---|---|
| 1,194,390 | Jenkins | Aug. 15, 1916 |
| 1,517,605 | Warren | Dec. 2, 1924 |
| 1,894,233 | Ellis | Jan. 10, 1933 |
| 2,354,183 | Crichton | July 25, 1944 |

FOREIGN PATENTS

| | | |
|---|---|---|
| 507,701 | Germany | July 19, 1930 |